United States Patent [19]

Parisien

[11] 4,174,187
[45] Nov. 13, 1979

[54] BOAT DOCK

[76] Inventor: Rudolph E. Parisien, 891 Rainbow St., Ottawa, Ontario, Canada

[21] Appl. No.: 896,041

[22] Filed: Apr. 13, 1978

[30] Foreign Application Priority Data

Apr. 18, 1977 [CA] Canada .................................. 276369

[51] Int. Cl.² .............................................. E02B 3/20
[52] U.S. Cl. .................................... 405/221; 182/178
[58] Field of Search .................. 61/48; 52/283, 236.6; 182/178, 179, 141; 405/221

[56] References Cited

U.S. PATENT DOCUMENTS

| | | | |
|---|---|---|---|
| 907,645 | 12/1908 | Sauber | 61/48 |
| 3,081,601 | 3/1963 | Fentiman | 61/48 |
| 3,176,470 | 4/1965 | Stiff | 182/179 |
| 3,262,139 | 7/1966 | Cambell | 61/67 X |
| 3,390,741 | 7/1968 | Catapano | 182/179 |

Primary Examiner—Jacob Shapiro
Attorney, Agent, or Firm—A. W. Breiner

[57] ABSTRACT

A dock constructed of a pair of trusses each of which includes two spaced apart channel members having tubular bridging material therebetween. Cross members adjacent the ends of the trusses join the channel member in spaced apart relationship so that decking material can be supported by the trusses. The channel members used are of the type having a longitudinally extending restricted opening in one side. These slots facilitate bolting bridging and cross members to the channel members. The dock is supported by upright channel members located adjacent each corner. These upright members are adjustably secured by angle brackets bolted in the restricted openings therein and to the trusses so that the height of the dock can be adjusted.

7 Claims, 14 Drawing Figures

BOAT DOCK

This invention relates to improvements in docks for small watercraft and more particularly to a dock capable of being readily removed for winter storage and reinstalled at the beginning of the next boating season.

Attempts to provide a portable demountable dock have not been entirely satisfactory in that they have been fabricated of relatively heavy materials which are subject to rot and rust. Furthermore docks prefabricated in the factory whether by welding in the case of iron docks or by special connectors in the case of aluminum, are bulky consequently requiring a great deal of storage space as well as being more difficult to ship to the site.

It is therefore an object of this invention to provide a strong lightweight boat dock the major components of which are fabricated of aluminum alloy or the like.

A further object of the invention is the provision that all the individual components can be packed in a container for shipping. It being possible for a person to assemble the dock on site using readily available tools.

Accordingly the present invention provides a boat dock comprising a pair of spaced apart trusses adapted to support decking, each said truss comprising upper and lower channel members spaced apart by braces angularly disposed with respec to said channel members, a cross member at each end of said dock for joining ends of said upper channel members at each end of said dock, a gusset plate at each corner of said dock extending diagonally between said upper member and said cross member, upright members adjacent each corner for supporting said dock, said members being in the form of channel members each having a restricted longitudinal opening in one side and a right angle bracket secured to each said lower channel member adjacent each end of each member so that a bolt extending through each said bracket extends into the restricted opening in said upright member and is adapted to adjustably secure said upright member to said lower channel member.

In the accompanying drawings which illustrate embodiments of the invention

Figure 1:
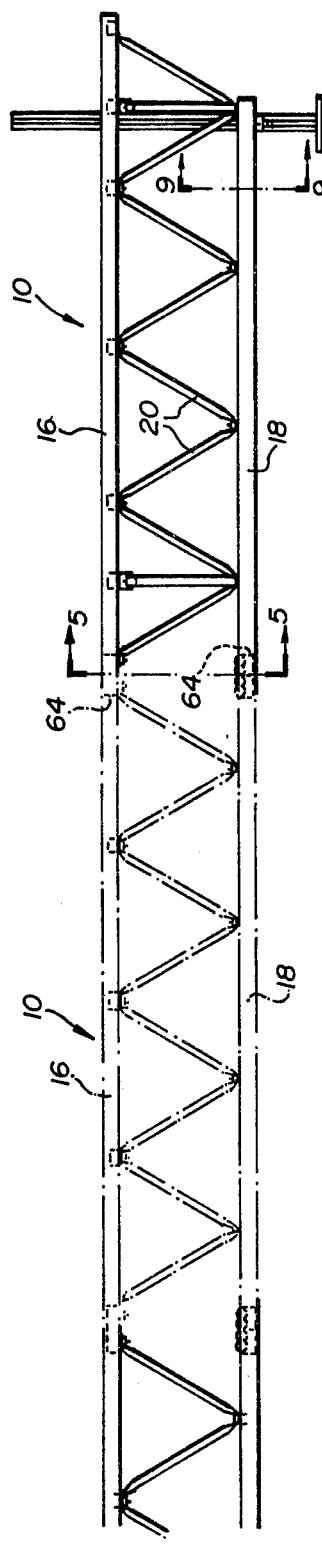
FIG. 1 is a side elevational view of a protion of a boat dock constructed in accordance with this invention.
Figure 2:
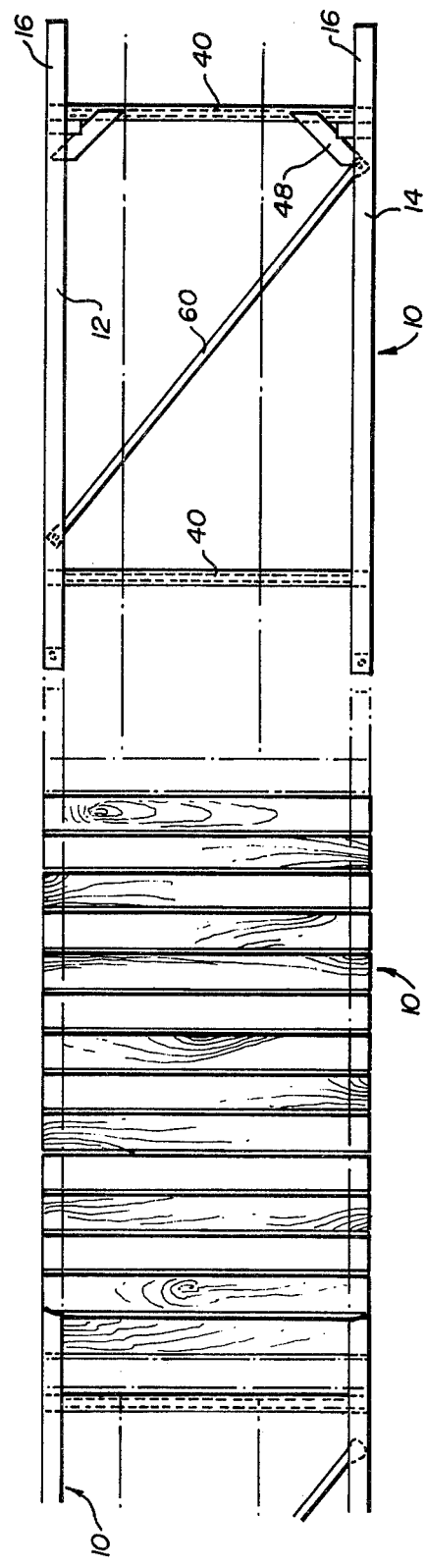
FIG. 2 is a top plan view of the dock of FIG. 1.

Referring now in detail to the drawings FIG. 1 and 2 show a number of dock units generally designated at 10 comprising essentially a pair of girders or trusses 12 and 14 each if which includes an upper channel member 16 and a lower Channel member 18 spaced apart by tubular braces 20 which form a series of isosceles triangles along the length of the upper channel member 16.

Figure 5:
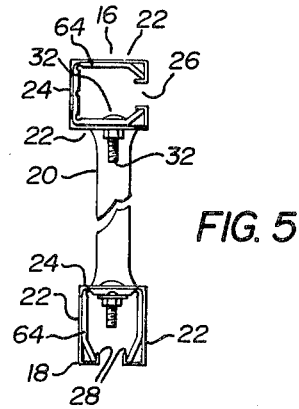
FIG. 5 is a cross sectional view taken along the line 5—5 of FIG. 1.

As shown more clearly in FIG. 5 each of the channel members 16 and 18 are in the form of an elongated channel having a pair of side walls 22 and an interconnecting wall 24. The side walls 22 have their free edges bent inwardly to define a restricted opening 26 and a pair of ribs 28. It will be noted that in this embodiment the channel members 16 are disposed with their openings 26 facing inwardly (See FIG. 3), to receive decking 30 such as planks or plywood, while the members 18 have downwardly directed slots 26.

Figure 8:
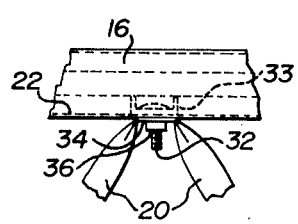
FIG. 8 is an enlarged side elevation showing braces secured to a top member of the dock frame.

In FIG. 8 a pair of braces 20 are shown together with a portion of the upper channel member 16. The ends of the braces have been flattened and provided with suitable apertures. A carriage bolt 32 extends through a channel washer 33 within the channel and through an aperture in the side wall 22 of the member 16, a washer 34 and nut 36 are provided on the threaded end of the bolt 32. It should be noted that the washer 33 as shown more clearly in FIG. 9A is used so that its square aperture will receive the carriage bolt 32. Since the channel washer 33 cannot turn in the channel member 16 because of its size and shape this holds the bolt 32 while the nut 36 is turned. It is not necessary to have the ribs 38 on the channel washer in this instance but in order to standardize parts the channel washer 33 is used throughout.

Figure 3:
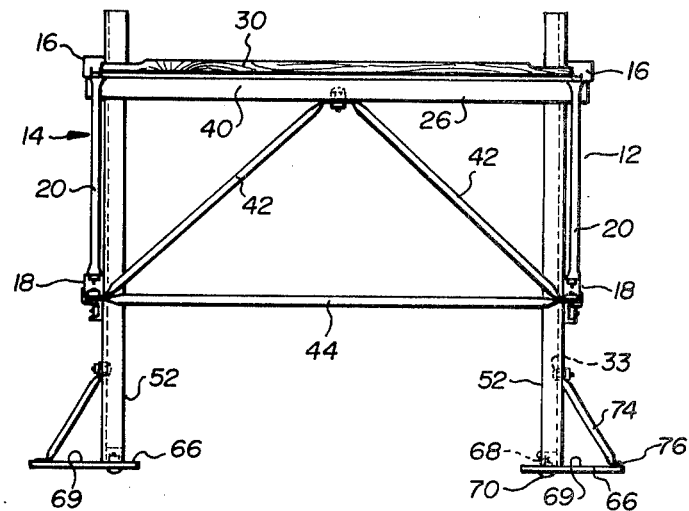
FIG. 3 is an end elevational view of the dock of FIG. 1.
Figure 4:
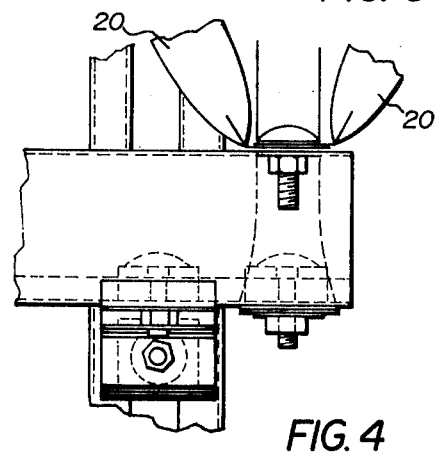
FIG. 4 is an enlarged side elevational view of a portion of the dock of FIG. 1 showing a post bolted to a lower frame member.

The trusses 12 and 14 as shown in FIG. 3 are held in spaced parallel relationship by cross members 40 which have their ends bolted to the ends of the upper channel members 16. The cross members 40 comprise channel members having the same cross section as the channel member 16 and the slot 26 therein is disposed downwardly.

A pair of tubular diagonal cross braces 42 have their flattened ends bolted to the lower channel members 18 and to the midportion of each of the cross members 40.

Figure 6:
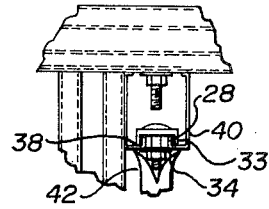
FIG. 6 is an enlarged side elevational view of a portion of the dock of FIG. 1 showing a cross member.

The bolt 32 extends through a channel washer 33 in the cross member 40, as shown in FIG. 6. A standard circular washer is provided on the bolt 22 between the nut 36 and the flattened end of the cross braces 42. In this case the ribs 38 on the washer 33 are turned so that they cooperate with the ribs 28 of the channel member 40.

In FIG. 3 a tubular cross member 44 having flattened apertured ends, extends between the trusses 12 and 14 at each end thereof and shares the bolt 32 which secures the tubular cross braces 42 to the member 18 at each side of the dock.

Figure 7:
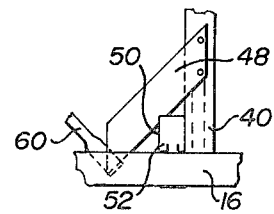
FIG. 7 is an enlarged top plan view of a portion of the dock of FIG. 2 showing the gusset plate.

At each corner of the dock section 10 there is a gusset plate 48 as shown more clearly in FIG. 7. The gusset plate 48 has one end bolted to the cross member 40 and its other end bolted to the upper channel member 16. A notch 50 in the gusset plate 48 is provided to accomodate an upright support post or leg 52 which extends therethrough. The post 52 is retained between the channel member 16, the cross member 40 and the gusset plate 48.

Figure 9:
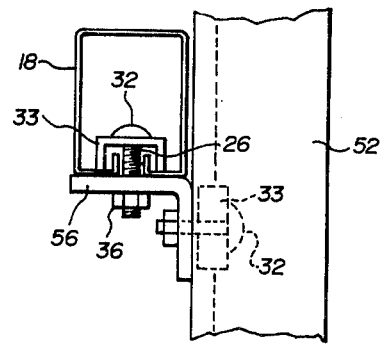
FIG. 9 is a sectional end elevational view taken along the line 9—9 of FIG. 1.
Figure 9A:
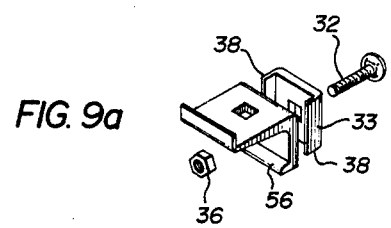
FIG. 9A is an exploded perspective view of the bracket assembly of FIG. 9.

With reference to FIG. 9 each of the posts 52 provided at the corners of the deck 10 has its lower end adjustably secured to a lower channel member 18 through the use of an angle bracket 56, shown in more detail in FIG. 9A, which has first and second walls disposed at right angles to each other, each of which has an aperture. The bracket 56 is bolted to a channel washer 33 in the channel member, which comprises the post 52, by a bolt 32 which passes through the channel washer 33 from the inside, through the slot 26 and the bracket 56 to receive a nut 32 on its threaded outer end. The other wall of the bracket 56 supports the channel member 18 and is bolted through the opening of the channel member through the use of a channel washer 33 in the manner previously described. It will be appeciated that if the nut 36 holding the bracket to the post 52 is loosened the bracket can be moved along the restricted opening 26 thereby providing for relative movement between the upright post and the lower channel member 18 and the dock itself.

In order to limit lateral movement of the dock 10 sway bars in the form of diagonal tubular members 60 have been provided at both ends thereof. These sway bars each have flattened apertured ends one of which shares a bolt with one end of a gusset plate. The other end of the bar 60 is bolted to the channel member 16.

Since it is desireable to link dock sections together to provide the required length thereby facilitating shipping connecting means in the form of sleeves 64 have been provided to connect the dock sections 10 together. The sleeves 64 shown more clearly in FIG. 5 are also in the form of channels and can be inserted in the ends of the channel members 16 and 18. Bolts 32 are used to secure the sleeves 64 in the channel members.

In some cases it may be necessary to provide means for preventing the posts from sinking into soft ground, accordingly adjustable feet 66 have been provided. (See FIG. 3). The feet 66 are secured to the posts 52 by an inverted cap 68 which is first secured to a plywood or metal pad 69 by a bolt 70 passing therethrough and by a bolt or screw passing through the wall of the post 52 and the side of the cap 68. A tubular brace 74 on each foot 66 has one flattened end secured to the foot 66 by a bolt 76. The other end of the brace 74 is bolted through the slot to a channel washer 33 in the channel of the post 52.

Figure 10:
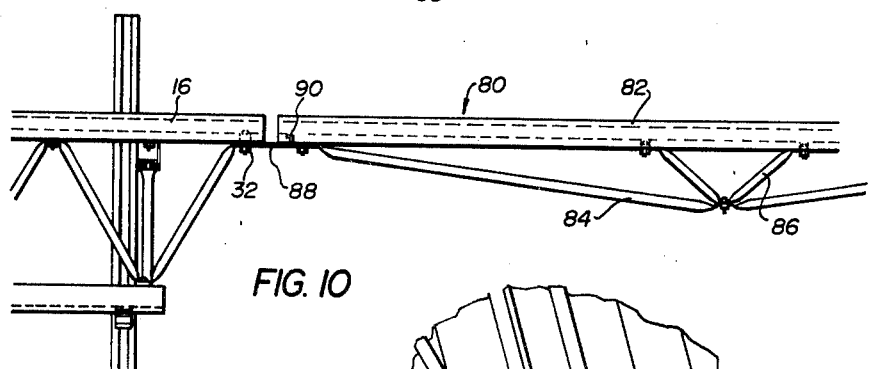
FIG. 10 is a side elevational view showing the other end of the dock of FIG. 1 to which a ramp has been attached.
Figure 11:
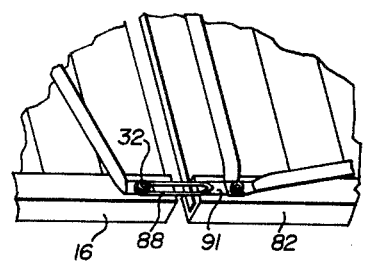
FIG. 11 is a perspective view of the underside of the dock and ramp showing the connecting means.

A ramp indicated generally at 80 in FIG. 10 is provided on the shoreward end of the dock section 10. The ramp 80 has side channel members 82, having the same cross section as the members 16 and 18, are disposed with restricted openings facing inwardly to receive edges of decking material such as plywood.

Long tubular braces 84 and short braces 86 are bolted to the underside of the side members 82 to provide rigidity. The ramp is preferably secured to the dock 10 in hook on relation by a pair of members 88 each of which has an elongated aperture through which the bolt 32 of the channel member 16 extends. The other end of the member 88 has an upright pin 90 received in an aperture in a reinforcing plate 91 secured to the underside of the side member 82.

Assembly of the dock sections 10 and the ramp 80 is facilitated by the use of channel members having an opening thus enabling the person assembling the dock to slide washers, which have been inserted at either end, along the length of the member and insert bolts through the holes provided. Furthermore, in a number of cases it is possible to have the bolt extend through the restricted opening of the channel and be anchored to a washer 33 within the channel. This arrangement not only provides for lateral adjustment but requires the drilling of fewer holes in the channel members.

Figure 12:
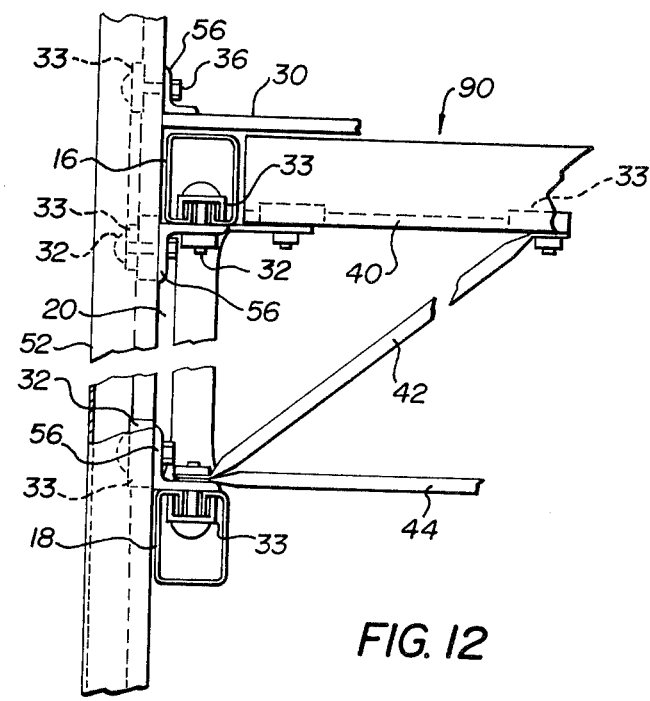
FIG. 12 is an end elevational view of a portion of a dock showing an alternative manner in which to bolt the various components to the channel members.

In order to further reduce the number of holes required in the channel members the alternative arrangement of the channel members as shown in FIG. 12 may be used. Since all parts of the dock shown generally at 90 have been described above it should only be necessary to point out that the channel members 16 and 40 have their restricted openings directed downwardly and the member 18 has its restricted opening directed upwardly. This facilitates bolting the tubular braces 20, 42, 44 and the gusset plate 48 to channel washers 33 within the member 16 and 18. The dock as shown in FIG. 12 also has the posts 52 on the outside and it is therefore necessary to provide a second bracket 56 to interconnect the top member 16 and the upright member 52.

The bracket 56 which connects the upright member 52 to the lower channel member 18 is inverted and bolted through the restricted opening in the channel member 18 through the use of a channel washer 33 in the manner described above.

For convenience sake a further bracket 56 may be provided above the decking 30 and be connected to the bracket 56 on the channel member 16 by a strap, cable, or the like 92, thus allowing the dock to be adjusted from above the deck by loosening the nut 36 provided of course that the nuts 36 on the two lower brackets 56 have not been fully tightened.

Figure 13:
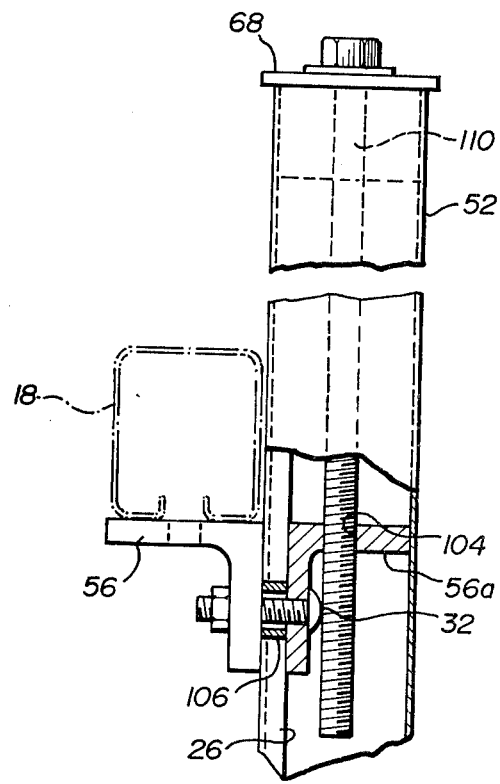
FIG. 13 is an elevational view partly in section of an upright member and adjustment means.

The dock 10 may also be provided with self contained jacking means as shown generally at 100 in FIG. 13. In this case each of the brackets 56 which support the member 18 is bolted to a modified bracket 56a through the slot 26 in the upright post 52. The bracket 56a difers from bracket 56 in that a tapped aperture 104 is provided. In order to prevent the bracket 56 and 56a from clamping the ribs of the member 52 therebetween a spacer 106 is provided on the bolt 32.

A cap 68 described above with reference to FIG. 3 having a suitable centrally located aperture is installed on the upper end of the upright member 52. A long bolt 110 preferably having a hexagonal head is then inserted through the aperture in the cap 68 and has its lower end threadedly engaged in the aperture 104 in the bracket 56a. The bolt 110 can thus be turned through the use of a wheel wrench or the like to move the brackets 56 and 56a up or down the upright 52. Since each of the brackets 56 support one corner of the dock 10 it is possible to raise, lower or level the dock while standing thereon.

The embodiments of the invention in which an exclusive property or privilege is claimed are defined as follows:

1. A boat dock comprising a pair of spaced apart trusses adapted to support decking, each said truss comprising upper and lower channel members spaced apart by braces angularly disposed with respect to said channel members, a cross member at each end of said dock for joining ends of said upper channel members at each end of said dock, at least one diagonal member extending diagonally between said trusses, upright members adjacent each corner for supporting said dock, said upright members being in the form of channel members each having a restricted longitudinal opening in one side and a right angle bracket secured to each said lower channel member adjacent each end of said lower channel member so that a bolt extending through each said bracket extends into the restricted opening in said upright member and is adapted to adjustably secure said upright member to said lower channel member.

2. A boat dock as claimed in claim 1 wherein said upright members are disposed on inner faces of said trusses and upper ends of said upright members extend through suitable apertures defined by associated diagonal members extending across corners of the dock from said upper member to said cross member, said diagonal members also serving as gusset plates.

3. A boat dock as claimed in claim 1 wherein each said channel member has a pair of side walls and an interconnecting wall, said side walls having their free edges bent inwardly to define a restricted longitudinal opening and having a further bend to define ribs extending along said restricted opening.

4. A boat dock as claimed in claim 1 wherein said bolts extending through said brackets also extend through washers in said channel members.

5. A boat dock as claimed in claim 4 wherein said washer is rectangular and has a pair of ribs on opposed side edges thereof for cooperation with inturned portions of said channel members.

6. A boat dock as claimed in claim 1 having means slideable within said upright member and connected to said slideable right angle bracket, an elongated member, at least a lower portion of which is threaded disposed in said upright member so as to have its lower portion threadedly engage said means in said upright member, an upper end of said elongated member extending through a cap on an upper end of said upright member and a head on said elongated member for engaging said cap so as to control downward movement of said elongated member, said head being adapted to be engaged for turning said elongated member so as to raise or lower said dock on said supporting upright members.

7. A boat dock as claimed in claim 1 wherein said upper channel members have channels disposed inwardly to receive edges of decking material.

* * * * *